No. 726,657. PATENTED APR. 28, 1903.
B. EARL.
CALF OR COLT WEANER.
APPLICATION FILED NOV. 13, 1902.
NO MODEL.

Witnesses
B. Earl, Inventor
Attorneys

UNITED STATES PATENT OFFICE.

BRUCE EARL, OF HANCOCK, NEBRASKA.

COLT OR CALF WEANER.

SPECIFICATION forming part of Letters Patent No. 726,657, dated April 28, 1903.

Application filed November 13, 1902. Serial No. 131,256. (No model.)

*To all whom it may concern:*

Be it known that I, BRUCE EARL, a citizen of the United States, residing at Hancock, in the county of Dundy and State of Nebraska, have invented a new and useful Calf or Colt Weaner, of which the following is a specification.

This invention relates to devices adapted to be attached to calves, colts, and other young animals which will effectually prevent them from nursing, but which will not prevent them from grazing; and the object of the invention is to produce a simple device formed entirely of metal which is easily applied and which will not annoy the animal or be injurious to it.

The invention consists in certain novel features of construction, as hereinafter described, and specified in the claims following.

Figure 1:
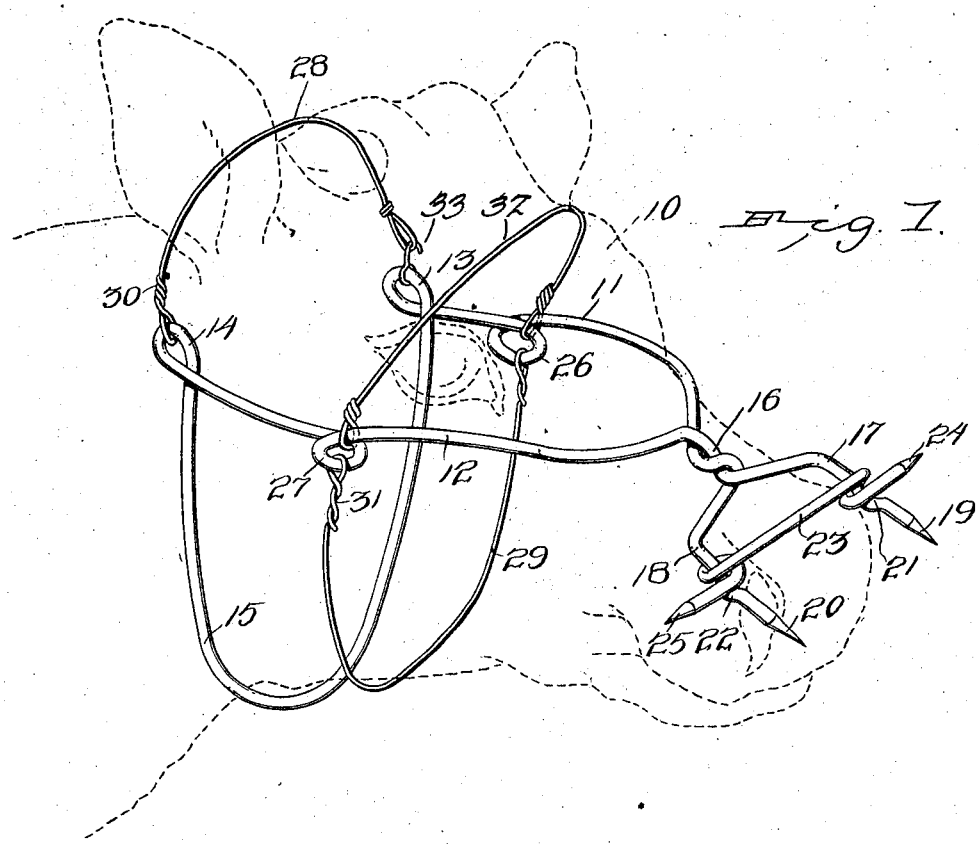
Figure 2:
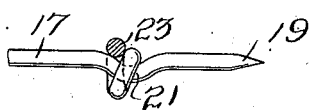

In the drawings illustrative of the invention, in which similar reference characters indicate corresponding parts in both figures, Figure 1 is a perspective view of the device complete, the outlines of the head of a calf being shown in dotted lines and located relative thereto. Fig. 2 is an enlarged detail of a portion of the structure, illustrating its construction.

The improved device may be attached to any nursing animal, but is more particularly designed for use upon calves or colts, and for the purpose of illustration a device adapted to be employed upon a calf is shown, the head of the calf being indicated in dotted lines 10.

The improved device may be readily adapted to the head of any animal with such slight modifications as may be necessary to fit the different sizes and shapes of the heads, and I do not, therefore, wish to be limited to any specific size or shape, but reserve the right to adapt the device to any size or species of animal upon which it may be required.

The improved device consists, generally, in a metal frame adapted to embrace the sides of the animal's head and extending over the nose and carried forward and terminating in barbs or points and with a transverse barb-ended bar or brace, the framework adapted to be connected to the head and jaws of the animal by metal bands, portions of the bands being sufficiently flexible to provide for the necessary adjustment to different-sized animals. By this means the employment of fragile straps formed of destructible material is avoided, thereby greatly increasing the durability of the device and preventing the animal from releasing itself therefrom.

The framework will preferably be formed of a single piece of wire bent to shape and comprising side members 11 12, adapted to embrace the sides of the animal's head and formed into loops 13 14 at their rear or inner ends, the loops extended into a band 15, adapted to embrace the under side of the throat of the animal, as indicated.

The side members 11 12 are crossed over the nose of the animal and entwisted, as at 16, and thence extended laterally and carried forward and spaced apart, as at 17 18, and terminating in barbs or points 19 20, the barbs extending beyond the animal's nose, as indicated.

The portions 17 18 are formed with depressions 21 22 intermediately of their lengths, and coiled around these depressed portions is a transverse brace-bar 23, extended laterally beyond the members 17 18 and terminating in barbs 24 25, the brace being held by the depressions. Formed in the side members 11 12 between the loops 13 and the joint 16 are loops 26 27, as shown, these latter loops disposed intermediately of the side members and in transverse alinement with each other.

The framework will be formed, preferably, to bring the loops 13 14 substantially opposite or in alinement with the butts of the ears of the animal, as indicated in Fig. 1, and the loops will be connected by a flexible wire band 28, passing over the head of the animal behind its ears and forming an adjustable and flexible means of supporting the frame in position upon the head.

The loops 26 27 will likewise be connected beneath the jaws of the animal by a similar flexible wire band 29 and over the nose by a flexible band or loop 32, as shown.

The framework will be formed of relatively heavy wire, so that it will resist any strains to which it may be subjected and will not be readily broken by any obstructions with which the animal may come in contact while the device is attached to it, while the members 28, 29, and 32 will be formed of flexible or ductile wire, which may be readily connected to and disconnected from the holding-loops, and thus enable the device to be readily attached or detached and adjusted to different-sized animals.

The bands 29 and 32 will preferably be permanently attached, as by twists 31, to the loops 26 27, and the band 28 will be connected permanently to loop 14 at one end by twist 30 and detachably connected to the loop 13, as by a loop or open hook 33, as indicated. The bands 29 32 being connected by merely twisting the wire of which they are composed around the larger wire composing the loops 26 27 may be readily detached for shortening or lengthening the bands or replacing them when broken. The bands 29 32 may, however, be detachably connected to the loops 26 27 by means other than by the twists; but as these members do not require to be detached when the weaner is removed they will generally be permanently attached, as shown.

The band 29 will form a strong pressure beneath the jaws of the animal when it elevates its head above a normal position, as in the act of attempting to nurse, this pressure causing the animal sufficient annoyance to force it to drop its head again.

The members 15 29 must be sufficiently large to permit the outer end of the framework to be lifted to a sufficient extent when the animal is feeding or grazing, and thus not interfere with it when thus occupied, while at the same time engaging the head sufficiently close to prevent displacement. With this arrangement attached to the head of an animal any attempt to nurse would cause the barbs 19 24 to pierce the mother animal and cause her to leave the nursing animal.

Having thus described the invention, what is claimed is—

1. A weaner comprising a frame formed of spaced side members embracing the animal's head at the sides and reversely disposed across the nose, and thence spaced apart and extended forwardly and with barbed extremities, means for connecting the rear ends of said side members beneath the throat of the animal, means for yieldably connecting said side members beneath the jaws of the animal, and a yieldable band connecting the rear ends of said side members over the head of the animal, substantially as described.

2. A weaner comprising a frame formed of a single piece of wire bent to shape with spaced side members embracing the animal's head at the sides and crossing over the nose and united at the crossing-point and spaced apart and extended forwardly with barbed terminals, the side members having intermediate loops, and a band connecting the rear ends of the side members and extending beneath the throat of the animal, a flexible band connecting the side members over the animal's head, and a flexible band connecting said intermediate loops beneath the animal's jaws, substantially as described.

3. A weaner comprising a frame formed of spaced side members embracing the animal's head at the sides and reversely disposed across the nose and spaced apart and extended forwardly with barbed extremities, a brace-bar connecting said forward extensions transversely and having laterally-extended barbed extremities, means for connecting said side members at their rear ends beneath the throat of the animal, and yieldable means for connecting the rear ends of said side members over the head of the animal, substantially as described.

4. A weaner comprising a frame formed of spaced side members embracing the animal's head at the sides and reversely disposed across the nose and spaced apart and barbed at the ends with depressions in said forward extensions, a brace-bar looped around said forward extensions within said depressions and having laterally-extended barbed ends, means for connecting the rear ends of said side members beneath the throat of the animal, and flexible means for connecting the rear ends of said side members over the animal's head, substantially as described.

5. A weaner comprising a frame formed of a single piece of wire bent to shape with spaced side members embracing the animal's head at the sides and terminating at their rear ends in loops extended into a band beneath the animal's throat and crossing over the nose and united at the crossing-point and thence spaced apart and extended forwardly and provided with barbed terminals, with depressions in said spaced extensions and intermediate loops in said side members, a band formed of flexible wire connecting the loops between said throat-band and side members, a band formrd of flexible wire and connecting said intermediate loops in said side members, and a transverse brace-bar formed of a single piece of wire looped around said forward extensions within said depressions and with laterally-extended pointed ends, substantially as described.

6. A weaner comprising a frame formed of a single piece of wire bent to shape with spaced side members embracing the animal's head at the sides and crossing over the nose and united at the crossing-point and spaced apart and extended forwardly with barbed terminals, the side members having intermediate loops, a band connecting the rear ends of the side members and extending beneath the throat of the animal, a flexible band connecting the side members over the animal's head and a flexible band connecting said intermediate loops over the nose of the animal, and a flexible band connecting said intermediate loops beneath the animal's jaws, substantially as described.

In testimony that I claim the foregoing as my own I have hereto affixed my signature in the presence of two witnesses.

BRUCE EARL.

Witnesses:
JAMES BURKE,
ENOCH DAVID.